(12) United States Patent
Shu (10) Patent No.: US 11,280,418 B2
(45) Date of Patent: Mar. 22, 2022

(54) UNIVERSAL THERMAL ACTUATOR AND HYBRID HIGH INTEGRITY PRESSURE PROTECTION SYSTEMS

(71) Applicant: Jianchao Shu, Cypress, TX (US)

(72) Inventor: Jianchao Shu, Cypress, TX (US)

( * ) Notice: Subject to any disclaimer, the term of this patent is extended or adjusted under 35 U.S.C. 154(b) by 198 days.

(21) Appl. No.: 16/409,787

(22) Filed: May 11, 2019

(65) Prior Publication Data

US 2020/0355285 A1    Nov. 12, 2020

(51) Int. Cl.
*F16K 17/02*     (2006.01)
*F17D 1/20*      (2006.01)

(52) U.S. Cl.
CPC ............... *F16K 17/02* (2013.01); *F17D 1/20* (2013.01)

(58) Field of Classification Search
CPC ....... G05D 16/106; F16K 25/04; F16K 17/04; F16K 17/168; F16K 17/16; F16K 5/06; Y10T 137/86718; Y10T 137/7728
See application file for complete search history.

(56) References Cited

U.S. PATENT DOCUMENTS

| | | | | |
|---|---|---|---|---|
| 1,838,723 A * | 12/1931 | Welcker | ..................... | F16K 1/12 137/220 |
| 7,334,514 B2 * | 2/2008 | Shu | ..................... | F16K 31/1225 74/104 |
| 10,222,812 B2 * | 3/2019 | Shu | ......................... | F16K 17/048 |
| 2002/0074038 A1 * | 6/2002 | Dziorny | ................ | F01D 17/105 137/220 |
| 2015/0167888 A1 * | 6/2015 | Kanstad | ................ | F16L 59/161 165/96 |
| 2016/0356399 A1 * | 12/2016 | Shu | ........................ | F16K 3/0209 |
| 2017/0220053 A1 * | 8/2017 | Shu | ........................ | F16K 17/16 |
| 2018/0283561 A1 * | 10/2018 | Shu | ........................ | F16K 5/0663 |
| 2019/0064854 A1 * | 2/2019 | Abu-Zeid | ............. | E21B 17/203 |

* cited by examiner

*Primary Examiner* — Jessica Cahill (57) ABSTRACT

This invention relates to an universal thermal actuation imbedded in Hybrid High Integrity Pressure Protection System (H-HIPPS) for critical services in pipelines, refiners, power plants and subsea, the hybrid system includes a quick isolation subsystem between an overpressure zone and a normal pressure zone and a quick releasing subsystem between the overpressure zone and a lower pressure zone with quadruple redundancies, more particularly, the universal thermal actuation subsystem based on thermodynamics has a thermal system (pressure sources, volume vessel like air return reservoir and heat source) and a control chamber and shutter valves, the isolation subsystem system controlled by the actuation system has one normal open valve, the releasing subsystem system controlled by the actuation system has one normal closed valve, the actuation systems can be used for both linear and rotary actuation applications anywhere either remote locations or subsea.

10 Claims, 5 Drawing Sheets

UNIVERSAL THERMAL ACTUATOR AND HYBRID HIGH INTEGRITY PRESSURE PROTECTION SYSTEMS

BACKGROUND

This invention relates to an universal thermal actuation subsystem imbedded in Hybrid High Integrity Pressure Protection System (H-HIPPS) for critical services in pipelines, refiners, power plants and subsea, the hybrid system includes a quick isolation subsystem between an overpressure zone and a normal pressure zone and a quick releasing subsystem between the overpressure zone and a lower pressure zone with quadruple redundancies, more particularly, the universal thermal actuation subsystem based on thermodynamics has a thermal system (pressure sources, volume vessel and heat source) and a control chamber and actuators, the isolation subsystem system controlled by the actuation system has at least one normal open valve for isolating over pressurize fluids, the releasing subsystem system controlled by the actuation system has at least one normal closed valve and one normal closed valve for releasing over pressurize fluids, the actuation systems is used for both linear and rotary applications even without any electric power and electric signal or external power supply or subsea for emergence actions.

In 1988, Piper Alpha platform fire accident killed 167 people and costed $3.4 billion because of removing the Pump A's pressure safety valve, in 1999, a pressure relief valve failed on a 16-inch gasoline pipeline operated by the Olympic Pipe Line Company in Bellingham, Wash., spilling 277,000 gallons of gasoline into the river, as results the gasoline exploded, killing three young boys, the incident resulted in five felony convictions for Olympic employees and a $75 million wrongful death settlement, in 2010, Deepwater Horizon oil spill During the Deepwater Horizon drilling rig explosion incident on Apr. 20, 2010, the blowout preventer (BOP) should have been activated automatically, cutting the drill string and sealing the well to preclude a blowout and subsequent oil spill in the Gulf of Mexico, but it failed to fully engage. Underwater robots (ROVs) later were used to manually trigger the blind shear ram preventer, to no avail, but the blow off preventer failed to active, the U.S. government estimated the total discharge at 4.9 million barrels, there are numerous pipeline leak or explosion accidents in last 30 years reported by EPA, City Lab daily and other organizations.

Today there are two dependent solutions in the market for the overpressure problem (1) to block the overpressure fluid or fire fluid zone into a normal pressure zone (2) to release the overpressure fluid or fired fluid into a low pressure zone or safety tank, as far as the BOP reliable actuation control system is concerned, there is no solution.

With current HIPPS, the overpressure protection is achieved by reducing the risk of overpressure fluid to a tolerable degree. HIPPS design is governed by: IEC 61508: "Functional Safety of Electrical/Electronic/Programmable Electronic Safety Related Systems" IEC 61511: "Functional Safety: Safety Instrumented Systems for the Process Sector," ANSI/ISA S84.01-1996, "Application of Safety Instrumented Systems (SIS) for the Process Industry," API 170 Recommended Practice for Subsea High Pressure Protection Systems (HIPPS) In most cases, the HIPPS is equipped with two over pressure rating shut off valves, two actuators and pressure transmitters and a feedback control system, but this subsystem at this point is just a combination of conventional parts like two ball valves, two actuators and two pressure sensors and controller and is constructed under overpressure class at least two or three time in overpressure fluid zone even for a short period time and waste lot of materials and capacity in normal pressure conditions, this system has high cost and only acts at components level, so far there is no single valve or actuator, which are developed for a high integrity, seamless pressure protection system, as far as the validation test for the system, the current method is the partial stroke test, but it does not address the critical points like closed positions where the operation torque and forces would increase dramatically and the valve and the actuations could fail even they pass the partial stroke tests, moreover, for the valves, what is the pressure rating of the valve for surge pressure? What is the power redundancy for pressure sensors if the power supply is off?

The conventional releasing subsystem is constructed as an overpressure safety device under U.S. Department of Transportation, Pipeline Safety Regulations, Hazardous Liquids Part 195, paragraph 195.428, the subsystem includes the pressure surge relief valve like plug axial pressure surge relief valves, those valves are widely used in the pipeline protection from pressure surge and constructed with main three functions; sensing, tracking and releasing, the plug axial pressure surge relief valves have two types, a gas loaded and a pilot operated configurations, the gas loaded pressure surge relief system has a fast response time about 250 millisecond, but it is equipped with external energy resources like pressurized bottle nitrogen, pressure regulator, check valve, tubing, insulated plenum bottle and control boxes, but the system has lower reliabilities at both component levels as well at system levels, the conventional releasing subsystem not only reduce a system reliability, but also has high operation cost to remain the set pressure with high cavitation and erosion damages, while the pilot relief system is operated by internal fluid energy with a compact pilot, but it has pressure sensing functions and slow response time about two second or more and is less tolerated with dirty fluid and unreliable, every pressure releasing can cause 10 to 30% pressure or energy loss, but U.S. Department of Transportation, Pipeline Safety Regulations, Hazardous Liquids Part 195, paragraph 195.428 did not address redundancy issue, what if there were two pressure relief valves in the Olympic Pipe Line or Piper Alpha platform, the accidents could be avoided?

The conventional valve actuation systems are divided into three types, pneumatic, hydraulic and electrical systems in term of power systems, they are relatively mature for conventional applications, the conventional most fail-open and or fail-closed actuations are powered by springs as spring returns without monitoring devices, but for some challenging applications or server services like fast pressure protection less than one or two seconds or remote pipelines or pumping stations or compression stations and subsea drilling and production, offshore platform operation and subsea drilling and production or safety protections, the conventional valve actuation system just cannot meet the challenges, the first is the speech for isolating or releasing, time is life and money for each accident, the second is reliable power source availability, without electricity, how the modem computer driven control system would works, the third is safety issue for most cylinder assembly joint, they are equipped with long external bolts for containing pressure, the bolts are under constantly corrosion and tension either above water or underwater, the corrosion and creep can cause the cylinder assembly to fall apart and can kill the operators, on the other hand, for the actuation power supply, the gas over oil actuators is the current solution, the gas over oil actuator has a pneumatic-hydraulic-electric actuation combining system and is very expansive and larger and less reliable, some of them conventional valve actuation system powered by natural gas cause some environment issues, while the conventional valve actuation system used for subsea applications are equipped by other type of gas over oil actuators for safety valves or BOP applications, in fact the BOP is just other type of block valve, this system is powered by a group pressurized nitrogen bottles, finally the actuator installation is other issue, most valve is need to equipped with actuator to operate, but one time consuming process is to adjust a position between the valve shaft and the joint flanges, in short those systems are inefficient, unreliable and expensive, for example a 3000 psi pressurized bottle nitrogen on the land would become less than 1500 psi gas due to the deep water pressure and the deep water temperature and the actuation system is not reliable, what if there was a Deadman's switch in the BOP actuation system, the Deepwater Horizon accident could be avoided?

In short, the current solutions do not work efficiently and reliably, what are missing for all existing specifications or solution? What if there is no electric power for signal transformation or actuation! How many redundancy is needed for worst-case scenario or a failure mode, what is the speech of isolating or releasing with current technology? So the industry has long sought means of improving the performance of the pressure protection valve and the actuation systems enabling the valve to handle various flows under multiple extreme conditions.

In conclusion, insofar as I am aware, no such a system is formerly developed with versatile seal ring assembly, hybrid highly reliable pressure protection system, easy manufacturing at lower cost, they can be used for blocking and releasing overpressure fluids in critical services with the highest reliability.

SUMMARY

This invention provides a disrupt innovation, a novel systematic actuation solution for a capable fluid control system with imbedded universal pressure protection features instead of the conventional valve/actuator/sensor solution at a component level. In the system there is no relief valve or bock valve, but a pressure control actuation system to release or block over-pressurized fluid in a hybrid manner, the thermal actuators are embedded in the hybrid high integral pressure protection system for critical services or under extreme conditions even without electricity or external power supply, the thermal actuator is based on thermodynamics (ideal gas law with three basic elements pressure, volume and temperature (heat)). This hybrid pressure protection system combines relief and block functions in one unit and not only release overpressure fluid into lower pressure zone but also isolate overpressure fluid from normal pressures zone with novel thermal actuators and simple normal open and normal closed valves, this system greatly reduce total executing time and increase reliability with at least two redundancies, the block subsystem has a normal-open, standard pressure class valve integrated with the thermal actuation system and has the isolating time less than 2 second without damaging seat and shaft seal packing, the releasing subsystem has a normal-closed, standard pressure class valve integrated with the thermal actuation system and has the releasing time less than 2 second without damaging seat and shaft seal packing, the system with redundancy feature for the valves and the actuators include at least two pressure sensing devices, combination of blocking and relief at the same time greatly reduce the system cost and has the highest level of system reliability over all prior arts or existing products.

Accordingly, besides objects and advantages of the present invention described in the above patent, several objects and advantages of the present invention are:

(a) To provide high redundant pressure protection system, such a system has the highest system reliability for critical services or extreme conditions.

(b) To provide a universal thermal actuator based on thermodynamics, so such an actuator can be operated with multiple supply sources like hydraulic, pneumatic or electric powers, the system can operated in a remote area or under water condition with the highest actuation output or functions in an emergency as a Deadman's switch.

(c) To provide a universal actuator, so such an actuator can be operated in the double acting or single acting with air returned reservoirs without sucking any unfillet air and spring loaded forces, so it can prevent corrosion in internal actuation and any risk of unload spring set during assembling and disassembling.

(d) To provide a control system, such a system can be used for controlling a normal-open valves as block valves and normal-closed valves as well relief valves, it has a fast response time and releasing time, even if it is out of power and it acts like Deadman switch. (d) To provide a pressure protection system, so the system last 25 year service and fire safety service, the maintain period would increase at least five year period and reduce the operation cost and increase reliability.

(e) To provide an actuators system with reliable full stroke test, so the actuator system can be tested for full stroke without any blind spots, more importantly the full stroke test can be taken for the actuators while the valves are still in operation conditions, so the whole H-HIPPS would become really "high integrity" system, so the valve can actuated fast to closed or open for blocking and release over pressurized flow.

(f) To provide versatile actuators power supplies, so the valve can actuated with hydraulic, pneumatic, solar and electrical power supply or manual or diver interface under subsea operation or remote pipeline, such connection not only reduce the air pollution but also increase reliability.

(g) To provide reliable and environment safe power supply, the actuation system is no long needed to use the pressured natural gas or oil or water as power supplies.

To provide reliable and safe pressure vessel joint, such a joint can prevent catastrophic failure of pressure vessel under severe conditions, the actuation system is safe to be used.

Still further objects and advantages will become apparent from study of the following description and the accompanying drawings.

DRAWINGS

Drawing Figures

FIG. 13 is a "M" detail view of the assembly of FIG. 12.

FIG. 14 is an ISO view of an eccentric plug assembly of FIG. 13

FIG. 19 is a top view of two of the shutter valve assembly of FIG. 16

FIG. 20 is a cross sectional view of the valve assemblies of FIG. 19 along line D-D.

DESCRIPTION

Figure 1:
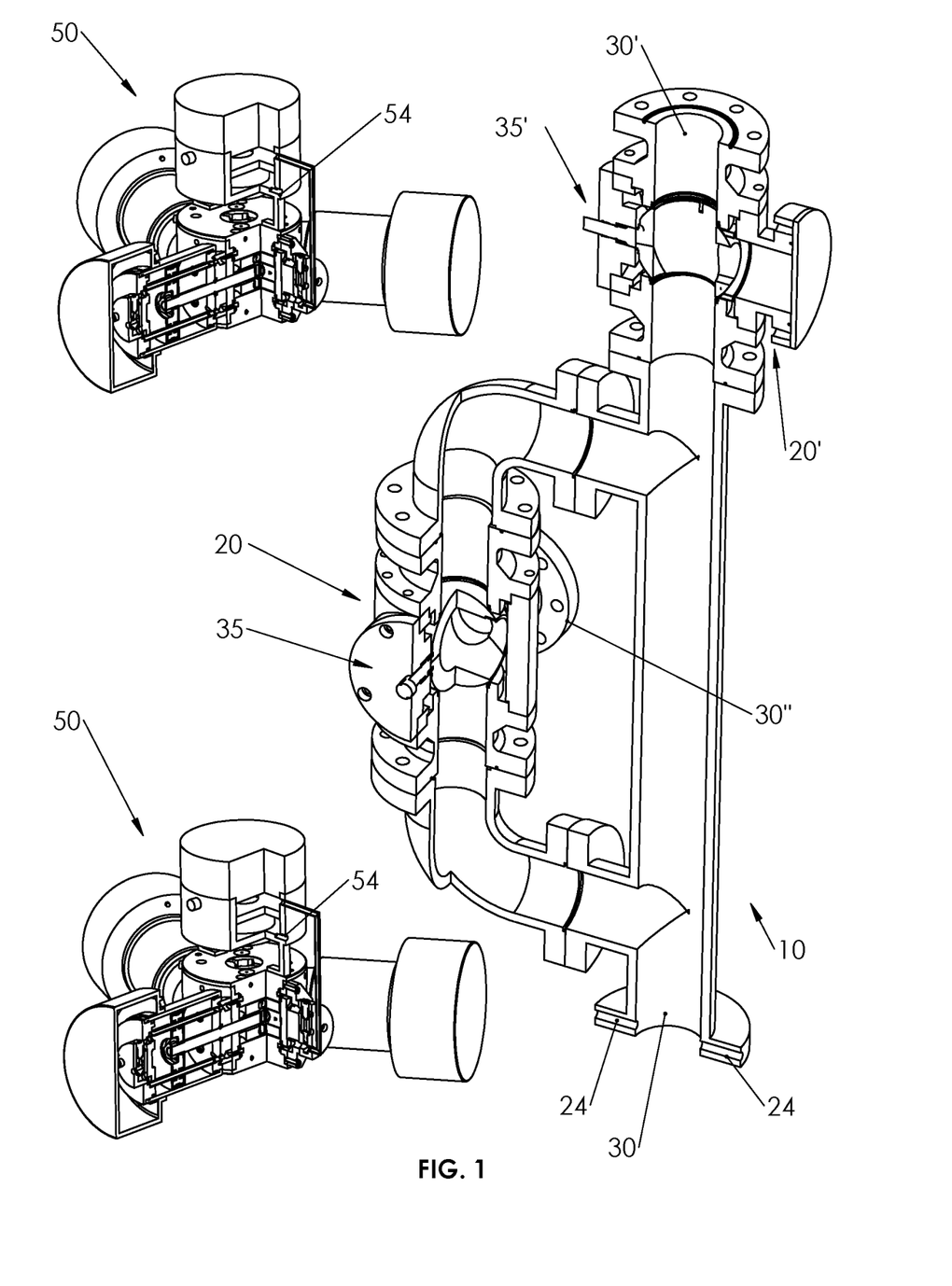
FIG. 1 is an exploded, quarter cut view of a pressure protection system constructed in accordance with this invention.
Figure 2:
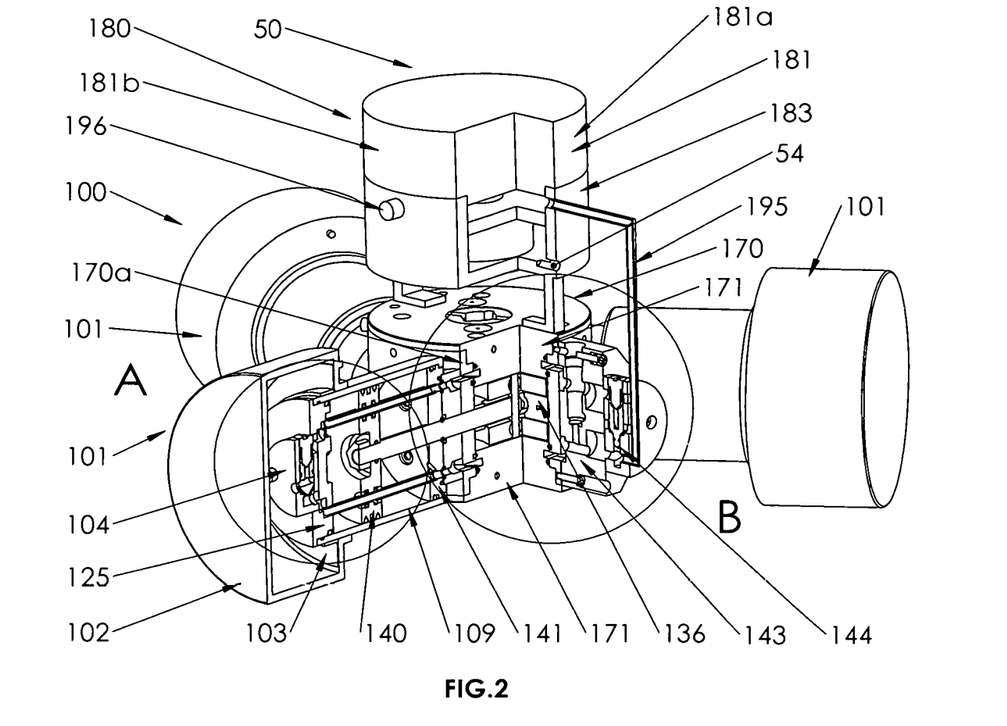
FIG. 2 is an exploded, quarter cut view of a thermal actuator of FIG. 1
Figures 3, 4:
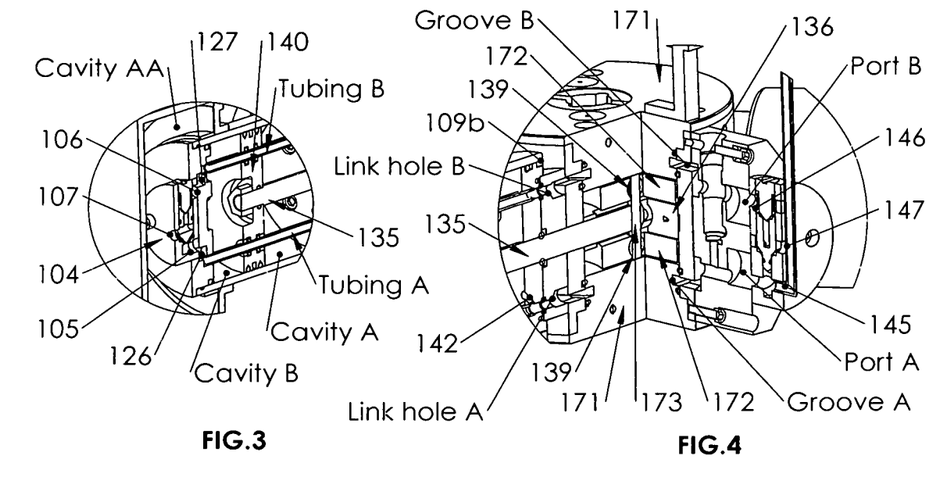
FIG. 3 is an "A" detail view of valve of FIG. 2
FIG. 4 is a "B" detail view of valve of FIG. 2

FIG. 1 illustrates a fluid control system 10, the system 10 has a right valve subsystem 20 and a left valve subsystem 20' constructed in accordance with the present invention, the system 10 has an inlet 30, an outlet 30' and release port 30" and sensing sections 24, the left valve subsystem 20' has a normally open valve 35' coupled with a thermal actuation subsystem 50 for controlling flows from the inlet 30', the thermal actuation subsystem 50 has a sensing section 54 connected with a sensing section 24 for sensing incoming flows from the inlet 30 (a tubing not shown), the right valve subsystem 20 has a normally closed valve 35 coupled with a thermal actuation subsystem 50 for controlling flows into the port 30" from the inlet 30, the thermal actuation subsystem 50 has the sensing section 54 connected with the sensing section 24 for sensing incoming flows from the inlet 30 (a tubing not shown).

Referring FIGS. 2-4, 8, 9 the thermal actuation subsystem 50 has a power supply assembly 180, a base actuator 100 and a control chamber assembly 183 with a safety valve 196 for on land applications and the power supply assembly 180 has a compressor 181 having a gas pressurizer 181a and a center air reservoir 181b, a tubing 195 for supplying fluid powers, the base actuator 100 has a rotary drive assembly 170 and three linear drive assemblies 101 to actuate the rotary drive assembly 170, the rotary drive assembly 170 has a body assembly 170a, a top flange assembly 171 and a bottom flange assembly 171, the body assembly 170a and the bottom flange assembly 171 have a link groove A and, a link hole A connected to the groove A, and the body assembly 170a and the top flange assembly 171 have a link groove B and a link hole B connected to the link groove B, the rotary drive assembly 170 also has a fluid pad assembly 143 with an inlet port A and an outlet port B and an intake shutter valve 144 disposed between the port A and the port B as an integral or separated part, the port A is connected with the compressor 181 through the tubing 195 and expanding to the link groove A, the port B is connected with a link groove B and a link hole B, the intake shutter valve 144 has a hole 145 connected with the inlet port A, a hole 146 connected with the link groove B, the intake shutter valve 144 has a front closed/back open position under low pressures or no pressure of the fluids from port A, a front open/back open position under high pressures of the fluids from the port A, the linear drive assembly 101 has a cylinder assembly 109, a piston assembly 140 movably disposed in the cylinder assembly 109, the piston assembly 140 and the cylinder assembly 109 forming a cavity A and a cavity B, an air reservoir 102 and a front plate assembly 125 defining Cavity AA, the cylinder assembly 109 has a back plate assembly 141 with a side port 142, a front plate assembly 125 with an internal shutter valve 104 and a pair of composite tubing A and tubing B respectively connected Cavity AA and Cavity B, the composite tubing A and tubing B are made out of nonmetal of one end for seals and metal for the rest structures, tubing B has an nonmetal end connected with the back plate assembly 141, the piston assembly 140 has a rod 135 having a pivot pin hole 135a and an end joint 135b, the front plate assembly 125 has bores 127 and 126 respectively connected with the cavity B and Cavity A with nonmetal of the composite tubing A for sealing, so nonmetal end joints provide the seals as well as strengths for high pressure applications and smoothly fast operations and long service, the internal shutter valve 104 having holes 106,105 respectively connected to bore 126 and bore 127 has a front closed/back open position under low or no pressures and a front open/back closed position under high pressures, when high pressurized fluid from power supply 180 flows into hole 145, the Port A and push the intake shutter valve 144 to the front open/back open position, the pressurized fluids get into the link groove A into cavity A through side port 142 for actuating the piston assembly 140 outward, while fluids in the cavity B is releasing through the tubing B, the link port B, the link groove B and pass the intake shutter valve 144 through the hole 147 and hole 146 are connected through passages 153 into port B, while the pressurized fluid gets into bore 126 in the front plate assembly 125 and through the tubing A and pushes the internal shutter valve 104 to the front open/back closed position, so the high pressurized fluid gets into the cavity AA in reservoir 102, when the high pressurized gas against line pressures fluid from sensing section 24 is reaching at a preset limit, the center shutter valve 194 is releasing the actuation fluid under subsea applications or the safety valve 196 is open in land applications, the pressure in the tubing 195 comes near zero, the intake shutter valve 144 moves back at a front closed/back open position, the hole 147 and the hole 146 are blocked to the port B, the internal shutter valve 104 moves back to a front closed/back open position, so the hole 105 is disconnected with bore 126 and the hole 107, hole 106 are respectively connected with hole 107 and bore 127, so the pressurized fluid in cavity AA flows into cavity B and push the piston assembly 140 moves inward as a function of air return instead of conventional spring return, while a three-way solenoid valve (not shown) may be used on the fluid pad assembly 145 with the internal shutter valve 104 for the same function as well.

Figures 5, 6, 6A, 7, 9, 10:
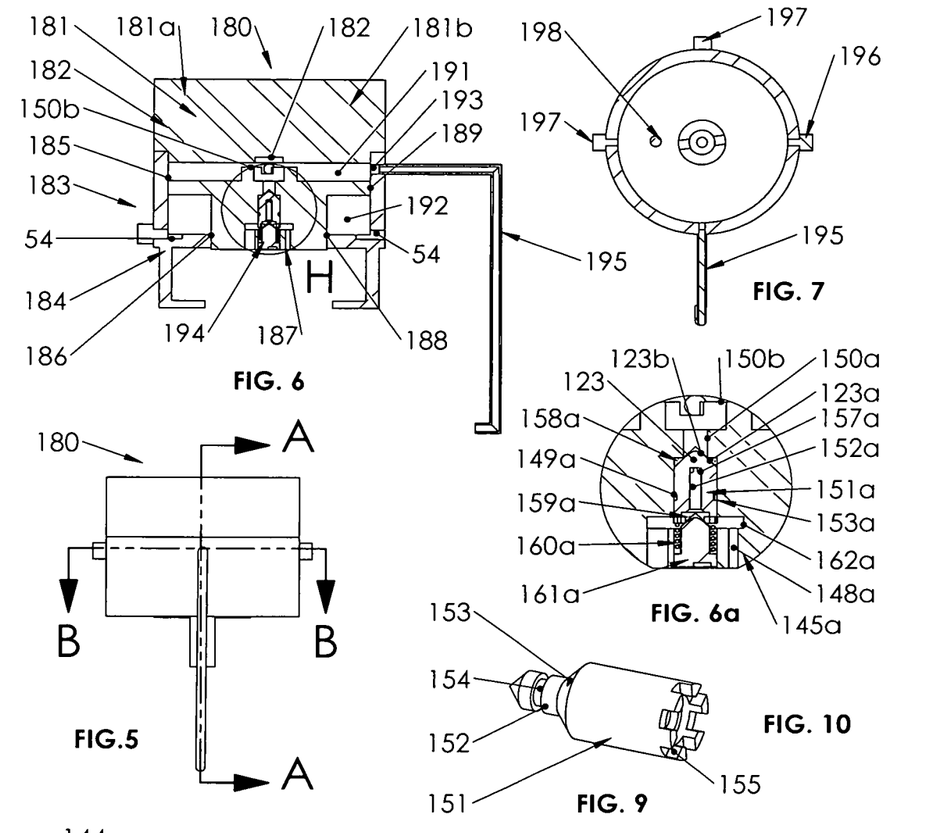
FIG. 5 is a front view of power supply assembly of FIG. 2.
FIG. 6 is a cross sectional views of supply assembly of FIG. 5 along line A-A.
FIG. 6a is a "H" detail view of valve of FIG. 6.
FIG. 7 is a cross sectional views of supply assembly of FIG. 5 along line B-B.
FIG. 9 is a cross sectional view of valve of FIG. 8 along line G-G.
FIG. 10 is an ISO view of shutter of FIG. 9.
Figure 8:
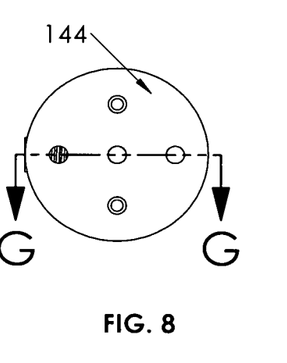
FIG. 8 is a top view of an entry shutter control valve of FIG. 2.
Figure 11:
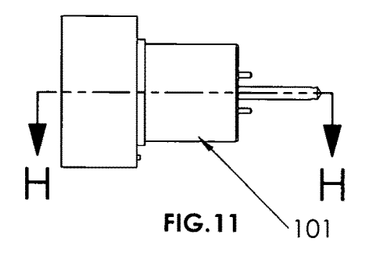
FIG. 11 is a front view of a linear moving actuator assembly of FIG. 2.
Figures 12, 15, 17, 18:
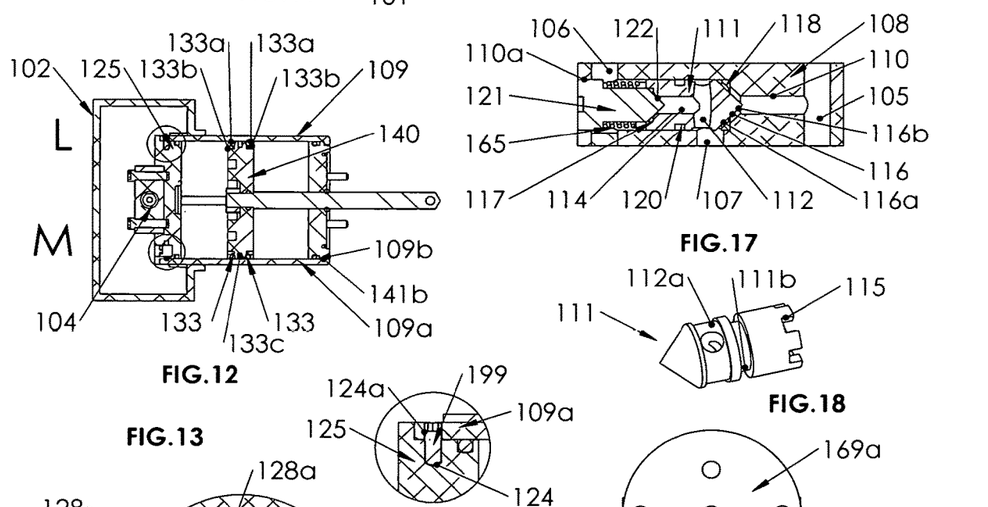
FIG. 12 is a cross sectional view of actuator assembly of FIG. 12 along line H-H.
FIG. 15 is a "L" detail view of the actuator assembly of FIG. 12.
FIG. 17 is a cross sectional view of the shutter valve assembly of FIG. 16 along line G-G.
FIG. 18 is an ISO view of a shutter of FIG. 17.
Figure 16:
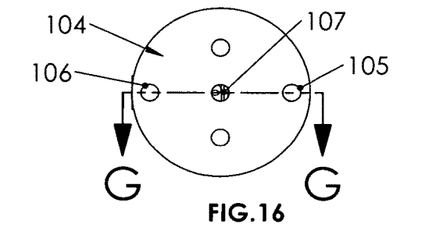
FIG. 16 is a top view of a shutter valve assembly of FIG. 12.
Figure 21:
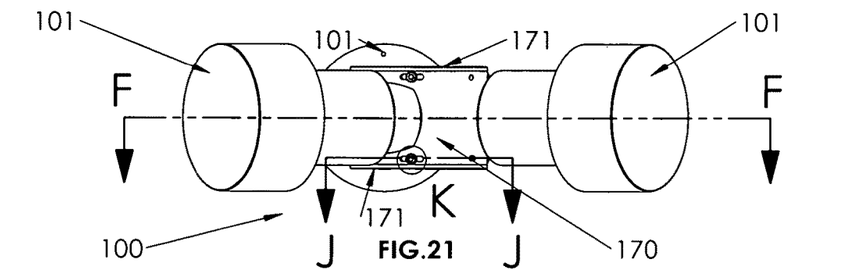
FIG. 21 is a front view of actuator base of FIG. 2.
Figures 22, 22A, 23, 23A, 24, 25:
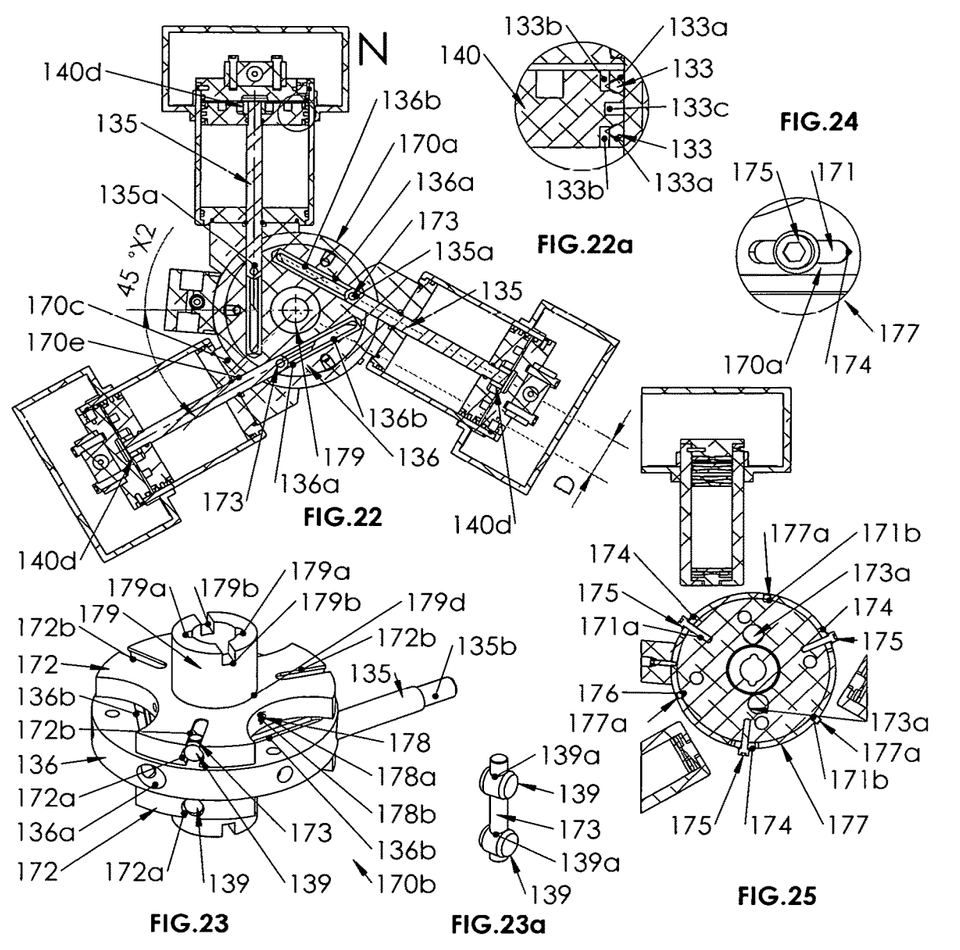
FIG. 22 is a cross sectional view of the actuator base of FIG. 21 along line F-F.
FIG. 22a is a "N" detail view of piston seal of the actuator of FIG. 22.
FIG. 23 is an ISO view of a rotor assembly of FIG. 22
FIG. 23a is an ISO view of a drive pin/rotary bushing assembly of FIG. 23.
FIG. 24 is a "K" detail view of the actuator of FIG. 21.
FIG. 25 is a cross sectional view of the actuator base of FIG. 21 along line J-J.

Referring FIGS. 5-7, the compressor 181 has an outlet 182 connected with the control chamber assembly 183, the control chamber assembly 183 has a housing 184 and a piston assembly 187 movably disposed in the housing 184 separating the housing 184 into an active cavity 191 and a sensing cavity 192, the housing 184 has a large bore 185 and a small bore 186, the inlet sensing port 54, an outlet port 193, the piston assembly 187 has a boss 150b to block the outlet 182 as a Deadman's switch in case high pressure in the active cavity 191 reaches a preset condition without electricity, a I straight pattern sensing bore 150a expanding to a bore 149a, the center shutter valve 194 having a shutter 151a disposed in the bore 149a, a large OD 189 engaged with the large bore 185 and a small OD 188 engaged with the small bore 186 for sensing and balancing pressures between cavity 191 and cavity 192 by a preset ratio between an area of the large bore 185 and an area of the small bore 186, the cavity 191 has a pressure sensor 197 and the pressure safety release valve 196 for sensing and releasing pressures in cavity 191 when the pressures in cavity 192 reach a preset pressure, the center shutter valve 194 as an integral part or separated part for releasing over pressures has a body 145a with multiple releasing ports 148a and a link groove 162a for releasing flows without causing cavitation and for protecting a shutter 151a from reactionary force of relief fluid, which is major cause of leak and jamming for right angle pop valves, a shutter bore 149a, the center shutter valve 194 has the shutter 151a disposed in the shutter bore 149a, a front seal ring 158a, a back adjustable seat assembly 159a and, a spring 160a biased between the shutter 151a and the back adjustable seat assembly 159a, the shutter 151a has a center hole 152a extending to multiple radial holes 157a and a head 123 having a sensing section 123b against the sensing bore 150a for sensing pressures in the cavity 192 and a seal section 123a against the seal ring 158a for front seals and the head 123 can be constructed with an extended tip like intake shutter valve 144 and acts like a limit switch as well when the piston assembly 187 moves up and down in the active cavity 191, the cavity 191 has a position sensor 198 to sense a position of the piston assembly 187 under pressure and has two ports 54 in the sensing cavity 192 respectively connected with the piping sensing sections 24 (tubing not shown) and pressure sensor 197, the sensing section 123b against the sensing bore 150a to form a hybrid sensing mechanism Referring FIGS. 8-10, the intake shutter valve 144 has a body 148 having a bore 149 expanding to a T type sensing bore 150, the hole 145, a shutter 151 movably disposed in the bore 149, a front seal ring 158 disposed in a front of the bore 149, a back adjustable seat assembly 161 and a back seal ring assembly 159 disposed between the shutter 151 and the back adjustable seat assembly 159 with a curve surface 162 for seals, a spring 160 biased between the shutter 151 and the back adjustable seat assembly 159 for creating a preset pressure, the shutter 151 has a head 152 having a sensing section 152b against the sensing bore 154a and the seal section 152a against the front seal ring 158, a center hole 156 expanding to multiple side holes 153 as three holes 153 as a set and multiple back slots 155 for releasing flows without cavitation damages, the sensing section 152b has a groove 154 to receive a seal ring 154a for creating full piston effect between front pressures and the spring 160, the seal section 152a against the front seal 158 for seals between the hole 147 and the bole 146 through the center hole 156, the shutter 151 with the extended tip 152b can be actuated by pressures or a manual, magnetic force or stopped by a hard stop, the body 148 has three holes 145, 146 and 147 respectively connected to the Port A, Port Band outside, the shutter valve 144 can be used as a pressure regulator with the hole 146 as an inlet, the hole 147 as an outlet, the hole 145 as a sensing port connected with each other as a pressure in the hole 145 increase and push the shutter 151 up and block the hole 146 against the spring 160, then the pressure in port 147 reduces, the spring 160 would push the shutter 151; back, then the hole 146 opens again, because it have the piston effect, the regulation performance become much better and stable.

Referring FIGS. 11-15, the linear drive assembly 101 can be used as a linear actuator and has a front plate assembly 125 and an air reservoir assembly 102 and a back plate assembly 141 with a side hole 142 and a back step 141b engaged with a L edge 109b of a cylinder 109a to prevent the back plate assembly 141 from separating from the piston assembly 140, the air reservoir assembly 102 has a heater 103 for heating air in the cavity AA in order to increase gas pressure, the heater 130 can be constructed as a solar heater or a gas heater or, a steam heater and or an electrical heater, the front plate assembly 125 has three bores 128 respectively expanding three moon-shape side slots 128a and three lock plug assemblies 130 respectively inserted into bores 128, each of lock plug assemblies 130 having a plug 130a with two slots 130b and three C shape spring rings 130c engaged with drive slots 130d inserted from side slots 128a into the slot 129 with a conical surface 129a on the cylinder 109a, as the plug assemble 130 is rotated clockwise with drive slots 130d, so the front plate assembly 125 can be inserted into the cylinder assembly 109 then as the plug assemble 130 is rotated anticlockwise back with drive slots 130d, the three C shape spring rings 134 are engaged with the conical surface 129a of the lock groove 129 for securing joints between front plate assembly 125 and cylinder assembly 109, so the redundant locking devices 199a further secure a joint between the front plate assembly 125 and the cylinder assembly 109, each of the locking devices 199a has a setscrew 199 threaded into a thread hole 124 of the cylinder 109a through a hole 124a on the front plate 125, so the linear drive assembly 101 has a flexible back joint with the back plate assembly 141 and a rigid joint with the front plate assembly 125 to compensate any misalignment between the rotary drive assembly 170 and the linear drive assembly 101 as well as over pressure relief from the back plate assembly 141 and thermal expansion without weakening bolts joint.

Referring FIGS. 16-20, the internal shutter valve 104 has a body 108 having a bore 110a expanding to a L type sensing bore 110 and a hole 105, a shutter 111 with a seal ring groove 111b and a seal ring 120 disposed in the seal ring groove 111b and a back seal ring 117 disposed between the shutter 111 and a back adjustable seat assembly 121 with a seal surface 122 engaged with the back seal ring 117 at a back closed position and a spring 165 biased between the shutter 111 and the back seat assembly 121 for creating a preset pressure, the seal ring 120 between the bore 110a and the shutter 111 for generating a piston effect against the spring 165, the shutter 111 has a head 116 with a sensing section 116b against the bore 110 for sensing and a seal section 116a, a center hole 114 expanding to multiple link holes 112 with a link groove 112a as at least one set of three holes 112 to create three fluid streams balances as well as three equal fluid force balances on the shutter 111 to center the shutter 111 as a hybrid balanced porting mechanism which provides both fluid and solid balance and to multiple back slots 115, the body 108 has three holes 105, 106 and 107, the valve 104 has a front seal ring 118 placed in the bore 110a against the seal section 116a for seals between the hole 110a and the hole 107, finally two the internal shutter valves 104 or 144 are constructed as a counter-balanced valve 169 which is used in hydraulic systems working with overriding (running-away) or suspended load and is designed to create back-pressure at the return line of the actuator to prevent losing control over the load, the shutter valve 104 can be used as a pressure regulator, the hole 106 as an inlet, the hole 107 as an outlet, the hole 105 as a sensing hole connected to the hole 107, as pressures in the hole 105 increase, the shutter 111 moves to block the hole 106, then pressures in the holes 107, 105 reduce without the fluid, the spring 165 push back, shutter 111 block path between hole 107 and 105.

Referring FIGS. 21-25, the base actuator 100 has the rotary drive assembly 170 and the three linear drive assemblies 101, the rotary drive assembly 170 has the body assembly 170a, a rotor assembly 170b disposed in the body assembly 170a and the top flange assembly 171 and the bottom flange assembly 171 respectively, to sandwich the body assembly 170a, the body assembly 170a has three offset bosses 170c to respectively bolted with three linear drive assemblies 101 by means of the three back plate assembly 141, each of linear drive assemblies 101 has the piston assembly 140 having a rod 135 having a drive pin hole 135a, a joint end 135, each of the piston assemblies 140 has a front V groove 133a extending to multiple link port 133b and to cavity B and a back V groove 133a extending to multiple link port 133b. and to cavity. A and a middle sealant groove 133c, two seal rings 133 are respectively disposed in the V grooves 133a to provide pressure energized seals between the piston assembly 140 and the cylinder assembly 109 and increate seal life and reduce piston frictions, each of three offset bosses 170c has an offset "D" from a center of the body assembly 170a, a rod bore 170e to receive the rod 135, the rotor assembly 170b has six drive bushing 139, six spring pins 178 and three drive pins 173, a fixed guide plate 136 and two rotors 172 respectively to sandwich the fixed guide plate 136 having a shaft through hole 179a, a partially hollow rotary shaft 179 inserted into the shaft through hole 179d, the fixed guide plate 136 has three guide bore 136a respectively expanding to a top slot 136b and a bottom slot 136b. Each of three guide bore 136a to guide the rod 135 through each of the rod holes 170e of three offset bosses 170c, each of the two rotors 172 has three radial bores 172a respectively receive the drive bushings 139 and three joint pin holes 178b, each of drive bushings 139 has a pin hole 139a, the shaft 179 has top three shaft pin holes 178a, and bottom three shaft pin holes 179a and two cylindered slot 179a for coupling with the valve and two slots 179b for coupling with actuators, so each of spring pins 178 is disposed between the joint pin holes 178b and the shaft pin holes 178a to secure joints between the shaft 179 and the rotors 172, once the rotor assembly 170b is disposed in the body assembly 170a, each of the rod 135 is inserted into the guide bore 136a of the fixed guide plate 136, finally each of the drive pins 173 is inserted through top bushing hole 139a, the drive pivot pin hole 135a and the bottom bushing hole 139a.

CONCLUSIONS

The present invention provides a long sought solution—a reliable, powerful and safe, efficient power supply for universal pressure protection, for fast cycle operations and for continuous operations of the fluid control systems during testing and repairing or valve actuation in any location, the thermal actuator is not a conventional related temperature base rather thermodynamics base, the ideal gas law, it applies all three basic elements (a) pressure (b) volume (c) heat to actuate a flow control system, the modern pneumatic and hydraulic actuation systems have over 100 year history, but there is no system so far with full three thermal elements as clear as this system to define a thermal actuation system, the fundamental difference between the conventional actuation system and this thermal actuation system is how to deal with three elements, pressure, volume and heat, the heat in the conventional actuation system is a form of energy waste, while the heat in this thermal actuation system generated by compressor, weather or heat tracing is a form of useful energy to increase the air pressure, so any heat form would help this thermal actuation based on all three basic thermodynamics elements (a) pressure (b) volume (c) heat, even with the conventional compressor, the outputs is about 80 to 150 psi, but with the elevated temperature by electric tracing or natural weather, the pressure can go up to 13.5 to 50% (pressure), so with large volume of the air reservoir (volume) and heated elevated temperature of air (temperature), even without an input air supply line, the actuator can performance like a double acting actuator, moreover the thermal actuation system with a solar power systems can be independently used without any conventional air supply, natural gas or hydraulic or electric power supplies or with conventional air supply or AC electrical power line as a standby power supply, finally the air supply source can be a portable air compressor or pressure supply line, the power supply source for the compressor can be AC power line or solar power, the air reservoir can be located at linear drive unit or center unit, the heat source, for subsea applications, a volume vessel with a heat system and insulation layers would be added to the conventional actuation system between the actuation system and the group of pressurized nitrogen bottles and would greatly increase pressure.

The control chamber assembly is the brain of the system in this invention, it combines all control elements, pre-set condition, sensing and judgment seamlessly as one unit at the highest level of adaptability and controllability for most control applications like the level control as the sense piston move up and down as a liquid level increase or decrease in the sensing cavity, or temperature control, as a temperate change in the sensing cavity, the piston can move up and down, or motion control and so on, the control chamber assembly is based on two human brain function with two systems; high level of control of the cerebrum system and a low level control of the cerebellum system, at the cerebrum system, the control chamber can make decision either to release, restore or block the line pressure and acts with or without electric signal or power and with a self-feedback function from the line pressure, while at the cerebellum system, it check the set pressure in the activity cavity against the line pressure in the sensing cavity with the center shutter valve, safety valve, the pressure sensor as redundant devices, at the low level of control, the valve functions become simpler and is no longer to define a block valve or relief valve, just simple normal closed and normal open valves, it integrates this pressure protection system at the lightest level of reliability, simplicity and lowest level of barrier over all exiting pressure systems in the market or in research and over all prior arts, while electronic sensor, digital control, wireless communication devices still can be added on this system to communicate with other devices or human through buses like profit-bus, foundation bus or wireless communication, the control chamber system can be used for both linear or rotary actuation system and subsea BOP or valve or tree/well flow or pressure controls, so there is no block or release but release/block actuator, only single control chamber system, it not only increase integrity of protection system, but also simplify the valve design and selection and eliminate the partial stroke testing, by switching functions between normally open positions to normally closed in the two valves with full stroke test and increase the reliability.

The shutter valves are the heart of the system in this invention to keep the fluid running in proper directions and react to the line pressure changes fast and precisely with the self-control, safe manner, without the shutter valves or the control chamber, the High Integrity Pressure Protection System would not be truly created. For the first time, the innovative shutter valve provide the hybrid sensing mechanism for both gas and liquid applications and has a novel shutter, it has the sensing section and the seal section, because the hybrid sensing mechanisms are based on a solid-fluid dynamics to study interactions between solid and fluid, the basic physics is that solid with shape and volume, liquid with volume and gas without volume and shape due to strength of molecule bonding, those features play key role in the interactions between the shutter head and fluid in the sensing bore, when fluid force solid force (spring/solenoid) >0 (Newton second law is no longer applicable after seal breaks, because liquid has no shape, gas has no shape and volume!!!), solid of the head starts to move away from the seal section, and breaks seal, then fluid conditions change, liquid condition changes between pressure and velocity are based on the Bernoulli's equation with the concave profiles, so the concave profiles would smoothen any small condition change without negative effects as the head moves back and forth from the sensing bore, while gas condition changes between pressure and volume are based on the ideal or real gas law with the flat or convex profiles, they would provide enough the front volume to stabilize the condition changes as the head moves back and forth from the sensing bore, but if the concave profiles are used for gas applications, the oscillation and chatter could happen, while the flat or convex profiles are used for liquid applications, high pressure loss, vibration, cavitations and turbulent could happen. with a center fluid passage instead of external fluid passage, so the shutter valve has double balanced seats unlike any other directional control valves spool or shear seal, it overcomes inherent radial spool sealing jamming or leakage due to erosion or cavitation, or high pre-stressed flat shear seal valve with high cost due to process, self-centering conical seal from both ends would keep the shutter either front seal or back seal, since the front porting and back porting are locate evenly around the shutter, any open/closed operation would not cause unbalanced wearing or reaction forces, while the middle groove with seal rings would prevent any possibility of inlet and outlet connection during transitions for some applications and creating full piston effect, moreover multiple middle grooves without the seal rings or with less friction of seal rings can help shutter move evenly faster for some application requirements, also the hollow shutter not only reduces the shutter inertia with less weights but also stabilizes the movements of shutter with a larger OD engaged surfaces especially for fast cycle operations, and is easily to control the directions of shutter between forward or backward movements, in other hand, the changeable ratio between the opening area and closed pressure area make speed control much easy and pressure release time and reseating time shorter, moreover the shutter with the extend tip can be actuated by a front pressure or acts like a limit switch in many applications like the control chamber as the piston assembly moves up, finally the shutter valve has multiple control functions (1) front open, back closed positions (2) front closed/back open positions (3) front open/back open positions and (4) a two-shutter valve combination become a counterbalanced control valve used for many hydraulic fluid control applications (5) a limit switch or manual switch for controlling flow instead of trigging by pressures, finally the hybrid sensing mechanism and the hybrid balance porting mechanism together provide the best solution for challenging applications like jet engine, gas turbine fuel delivery system and rock engine propulsion fluid system with high reliability and durability.

The present invention discloses other breakthrough achievement—the air return mechanism instead of spring return, the air return mechanism with the shutter valve not only does increases output force or torques without decreasing air acting forces, unlike the conventional spring return mechanism, which share the acting force about 40% and 10% converting loss from total capacity 100% of double acting forces or torque but also eliminates the spring return sets which is heavy, big and expensive and porn to corrosion with breath air holes, furthermore there is no entry of unfilled air into the actuator or air reservoir other than air supply, so no corrosion or particle would damage the actuator cylinder or air reservoir, more importantly the air return mechanism is constantly monitored by air pressure gauge and ready to act at any moment with the highest level of reliability, while spring set return is not constantly monitored, it can be weaken or corroded without any information of its condition for over time, under some working conditions like hot temperature, high humility or offshore platform, the air return reservoir can perform well at the designed condition for long service, where the spring return may not work well due to spring corrosion, creeping, finally the air return reservoir can be installed at any position, vertical, horizontal and between and with other actuators linear actuator, rack and pinion or vane actuators, there is no material fatigue issue, finally hot weather can help air return reservoir perform better without increasing heating cost or solar power consumption with heat absorbing material or dark color coating on the cylinder to increase pressure of the air on the reservoir or it can be added insulation layers and internal heater for cool weather locations or subsea as well, finally it is very suitable for earthquake area or high vibration applications, most actuators with spring return mechanisms are unbalanced, if with net spring set, the matter even gets even worse, so the actuators may not even survive, to preform is out of question.

The operational innovation features are long waiting solutions and include (1) the cylinder joint method with a rigid joint between the font plate assembly and the cylinder assembly with the novel locking device and a flexible joint between the back plate assembly and the cylinder assembly with the back step, the rigid front joint with the eccentric plug assembly and radial locking setscrew provide simple and antic corrosion robust locking mechanism, since the bolts are defined as a pressure container part in the pressure vessel standards around the world, according to Navy and major marine structures specifications, all vital bolts should be made out of Inconel alloy in order to prevent catastrophic failure due to corrosion where the seat water corrosion is a major problem, moreover this requirements not only greatly increase cost for the marine projects, but also create compatibility problem with surrounding parts like washer, nuts and welding areas, thanks to those novel joint method, there is no bolts on the cylinder assembly as pressure containing part parts even with setscrews, so the feature provides a redundant locking function, moreover there is no tension bolts in the rigid joint and the flexible joint, so even temperature change would not affect the joint seal with the back step, while the cylinder assembly with thermal expansion would not affect joint seal as well, meanwhile they are easy to assembly and disassembly and can stand for high cycle operations like high cycle relief application without retightening bolts and increase reliability and reduce the cost, as a result the linear drive assembly eliminate any joint leak or break due to those thermal expanding, the back joint with axial freedom successfully solves the creep issue for most pipelines and offshore applications (2) the porting system, most external tubing on the conventional actuator are constructed like spaghetti and can easily be hit and damaged, corroded and mislaid out, but this porting system with two porting systems A and B not only reduce tubing leak by accident hit during the operation and transportation and reduce the pollution if the naturel gases are used for actuation power supply, but also simplify porting tubing layout, the composite tubing A, B not only solve the corrosion issues but also balances load on the piston assembly, the nonmetal end of the tubing A can be secured with the front plate assembly for seals and joint and an open end connected with cavity A, the tubing A can be secured with front plate assembly to additional external outlet outside the front plate assembly for accelerating or decelerating open or closed speeds with multiple fluid pads for fast closing or opening less one second without damaging valve seat and stem packing by operating step opening or closing, three or two ports at the beginning and one or two ports at the closed position or vice versa, in offshore platform where the working space is very limited, so the internal tubing not only provides safe and secure flow line, but also have the shortest flow line and provide a multiple flow line for each piston, which not only have more flexible control with multiple fluid pad assemblies, so for quick closing operation, at beginning, three flow lines can be opened and in the end, only one flow control is set to open and reduce the impact force on the seat or packing of valves (3) the relative position adjustment is a great feature for most operators in the field, the conventional positions adjustment is based on a absolution positions change between 0-90 degree, while the relative position adjustment mechanism separating from the conventional absolute position adjustment is other disrupt innovation in this invention, for most operators in the field, a correct closed position of closure members like disc, ball or plug is critical for all rotary valve, even 0.5 degree off can cause leak, but 99% of stem position adjustments are about the stem relative position to the joint flanges bolt holes with no need to alter a factor set range 0-90+/−0.5 degree, only 1% of the actuation adjustments is an absolute adjustment between 0-90+/−5 or 10 degree, the relative positions adjustments on the rotatable interface plates is a simple solution to 99% problems, for further position security, anti-loosening washers or semi-permanent adhesive may be added with the bolts after setting a correct position, moreover the high friction structures with the setscrews is designed to secure the adjusted position as a redundancy, for 1% problems, the factory set 90+/−5 can be solved at the factory, it along saves 60% time in most rotary actuations installation, moreover the top and bottom flange assembly can be interchangeable, so without changing the design or installing the cylinder assembly, the direction of rotations of actuator can changed from clockwise to anticlockwise, or for any valve connection without body change especially in field repairs.

Without the high integrated thermal actuation system, the High Integrity Pressure Protection System would not be truly created, the currant pressure protection systems have many problems like unbalanced actuation system which is the inherent problem for the most actuators in the market, the actuation systems without protection device from excessive torsion or unbalanced or loosened joints between actuators and valve account for 80% valve seat or packing failures, so far no single valve or actuator manufacture recognize that, the universal thermal actuation system in this invention is a synergic improvement from two prior patents and is to aim to disrupt current solutions and improve the power supply efficiency and diversity and the overall performances by modularizing and equipped with the base actuator and the control chamber and valves.

Although the description above contains many specifications, these should not be construed as limiting the scope of the invention but as merely providing illustration of some of the presently preferred embodiments of this invention.

Thus, the scope of the invention should be determined by the appended claims and their legal equivalents, rather than by the examples given.

I claim:

1. A fluid process station has at least one fluid control system, each of the at least one fluid control system has a front access section having at least two front sensing ports and at least two back access sections, at least two valve subsystems respectively disposed between said front access section and the at least two back access sections for providing fluid control, each of the two back access sections has at least one back sensing port, each of the at least two valve subsystems has a valve and an actuation-control section assembly coupled with said valve, said actuation-control section assembly has a pressure power supplier, a base actuator assembly, a chamber control assembly, at least one shutter valve and at least one fluid pad assembly, said pressure power supplier has an external supplier or an internal supplier having a center fluid reservoir and a fluid pressurizer, said fluid process station has a first of the at least one fluid control system having a first of the at least two valve subsystems, the first of the least two valve subsystems comprises a first normally open valve having an inlet port connected to said front access section and an outlet port, said first of the at least one fluid control system comprises a second of the at least two valve subsystems, said second of the least two valve subsystems comprises a second normally open valve having a second inlet port connected to said outlet port of the first normally open valve, a second outlet port connected to a first of the at least two back access sections, said first of the at least one fluid control system comprises a third of the at least two valve subsystems, the third of the at least two valve subsystems comprises a first normally closed valve having a third outlet port connected to a second of the at least two back access sections, a third inlet port connected to said front access section, said fluid process station has a second of the at least one fluid control system, the second of the least two valve subsystems comprising a first of the at least two valve subsystems that comprises a first normally open valve having an outlet port, an inlet port connected to said front access section, the second of the at least one fluid control system comprises a second of the at least two valve subsystems that comprises a first normally closed valve having an outlet port, and an inlet port connected to said front access section, the second of the at least one fluid control system comprises a third of the at least two valve subsystems that comprises a second normally open valve having an outlet port connected to a first of the at least two back access sections, and an inlet port connected to said outlet port of the first normally open valve, the second of the at least one fluid control system comprises a fourth of the at least two valve subsystems that comprises a three way valve having an outlet port connected to said first of the at least two back access sections, a relief port connected to a second of the at least two back access sections, an inlet port connected to said outlet port of the first normally closed valve for directing flows between said outlet port of the three way valve and said relief port of the three way valve, said fluid process station has a third of the at least one fluid control system, the third of the at least one fluid control system comprising a first of the at least two valve subsystems that comprises a first normally open valve having an outlet port and an inlet port connected to a first of the at least two back access sections, the third of the at least one fluid control system comprises a second of the at least two valve subsystems that comprises a second normally open valve having an inlet port connected to said outlet port of the first normally open valve, an outlet port connected to said front access section, the third of the at least one fluid control system comprises a third of the at least two valve subsystems that comprises a first normally closed valve having an outlet port connected to a second of the at least two back access sections, and an inlet port connected to said outlet port of the first normally open valve, the third of the at least one fluid control system comprises a fourth of the at least two valve subsystems that comprises a third normally open valve having an outlet port and an inlet port connected a third of the at least two back access sections, a fifth of the at least two valve subsystems functioned as a fourth normally open valve having an inlet port connected to said outlet port of the third normally open valve, an outlet port connected to said front access section.

2. The fluid process station of claim 1, wherein the at least one shutter valve has a shutter body having a shutter bore extending to a sensing bore, at least two access ports, a shutter having an internal port movably disposed in said shutter bore, at least two seal rings, an adjustable back seat assembly, at least one spring biased between said shutter and said adjustable back seat assembly, said shutter has a head having a seal section, and a sensing section engaged with said sensing bore to form a sensing mechanism, said head and a peripheral of said sensing bore are made out of magnetic materials and non-magnetic materials, said sensing section comprises a concave profile, a flat profile or a convex profile, said shutter and said shutter bore have at least one link groove, said shutter has at least one set of equally spanned passageways between the at least one link groove and said internal port for providing equal non-crossover fluid streams, and for centering said shutter without rubbing and rotation, said shutter has an end having multiple slots for releasing fluid, said shutter bore and said shutter have a back groove linked to said multiple slots.

3. The fluid process station of claim 1, wherein said base actuator assembly has a rotary drive assembly, at least one linear drive assembly and a porting subsystem; said rotary drive assembly has a body assembly, a rotor assembly disposed in said body assembly, and two flange assemblies respectively to sandwich said body assembly; said body assembly has at least one offset boss connected to the at least one linear drive assembly, the at least one linear drive assembly has a piston assembly and a cylinder assembly forming a cavity A and a cavity B said piston assembly has two seal rings, a rod having a pivot pin hole and a piston having a front V groove extending to said cavity B through front side link ports and a back V groove extending to said cavity A through back side link ports, and a middle groove having a filling material, said two seal rings respectively disposed in said front V groove and said back V groove for providing pressure energized seals between said piston assembly and said cylinder assembly, said cylinder assembly has a front plate assembly and a cylinder having a L edge and a back plate assembly having a step locked with said L edge of said cylinder for restricting said cylinder, and at least one lock device having a fastener radially penetrated into said front plate assembly through said cylinder, and a plug assembly securing joints between said front plate assembly and said cylinder, said cylinder has a groove having a conical surface, said front plate assembly has at least one axial hole expanding to a radial moon slot, said plug assembly disposed in the at least one axial hole has a plug having a drive slot and two flat surfaces, a set of C spring rings engaged with said two flat surfaces from said radial moon slot, and engaged with said conical surface of said groove, the at least one offset boss has an offset D shape from a center of said body assembly and a rod bore to receive said rod, said rotor assembly has a shaft and a shaft bore to receive said shaft, at least two drive bushings and at least one drive pin, at least two joint pins, a fixed guide plate and two rotors respectively to sandwich said fixed guide plate, said fixed guide plate has at least one guide bore extending to a top link slot and a bottom link slot to define an absolute rotary limit of said shaft as well as an absolute travel limit of said rod and to guide said rod, each of said two rotors has at least one radial bore extending to a top pin slot and a bottom pin slot to receive one of the at least two drive bushings, each of the at least two drive bushings has a drive pin hole, said shaft having at least one cylindrical slot for valve coupling and at least one slot for actuator coupling, said shaft is respectively coupled with said two rotors by means of the at least two joint pins, each of the at least two joint pins said rod is movably inserted into the at least one guide bore of said fixed guide plate, the at least one drive pin is inserted into a first of the at least two drive bushings through said drive pin hole, said pivot pin hole of said rod, and into a second of the at least two drive bushings through said drive pin hole for providing conversions between linear moments of said rod and rotary movements of said two rotors, said rotary drive assembly has at least two position sensing/controllers respectively disposed in said two flange assemblies to sense positions of the at least one drive pin, and at least two sets of fasteners and at least two fasteners for adjusting relative positions between said two flange assemblies and said body assembly having at least two adjusting slots, the at least two sets of fasteners respectively penetrated into said two flange assemblies through the at least two adjusting slots and the at least two fasteners respectively penetrated into said two flange assemblies through said body assembly, said porting system has a porting B subsystem and a porting A subsystem, said porting B subsystem has a port B connected to a composite tubing B in said back plate assembly through a link groove B between said body assembly and a second of said two flange assemblies, said composite tubing B has a seal nonmetal end constructed to said back plate assembly and a metal housing connected to said cavity B through said piston assembly, said porting A subsystem has a port A connected to a link groove A between said body assembly and a first of said two flange assemblies extending to said cavity A and to a composite tubing A, said tubing A has a metal housing and a seal nonmetal end constructed with said front plate assembly and a bypass port connected between said cavity A and said link groove A on said back plate assembly.

4. The fluid process station of claim 3, wherein said base actuator has said rotary drive assembly and the at least one linear drive assembly, the at least one linear drive assembly having a fluid reservoir having a heater, and a first of the at least one shutter valve; said front plate assembly having a port C and a port D, respectively extending to said Cavity B, is connected to said fluid reservoir forming a cavity AA, said first of the at least one shutter valve has a first of the at least two access ports connected to said port C and to said sensing bore, and a second of the at least two access ports connected to said port D through said back groove, a third of the at least two access ports linked between said cavity AA and the at least one link groove, said first of the at least one shutter valve has also a first of the least two seal rings disposed between a front of said shutter bore and said seal section of said head, a second of the least two seal rings disposed between said end of said shutter and said adjustable back seat assembly.

5. The fluid process station of claim 4, wherein said first of the at least one shutter valve is a pressure regulator, said pressure regulator has said third of the at least two access ports used as a downstream port, said first of the at least two access ports connected to said downstream port used as a sensing port, said second of the at least two access ports used as a upstream port.

6. The fluid process station of claim 1, wherein said chamber control assembly has a housing having a ceiling entry boss communicated to said pressure power supply and a first bore extending to a second bore, the first bore being lager than the second bore, a control piston assembly movably disposed in said housing forming an active chamber and a sensing chamber, said sensing chamber is connected to one of the at least two front sensor ports, said active chamber is communicated to the at least one fluid pad assembly and said pressure power supplier, said control piston assembly has a first mated cylinder and a second mated cylinder, the first mated cylinder being lager than the second mated cylinder, the second mated cylinder being respectively engaged with said first bore and said second bore, a top boss engaged with said ceiling entry boss for seals when said control piston assembly reaches at a preset condition, said control piston assembly has a shutter valve bore extending to a sensing hole on said top boss, a piston back groove extending to multiple relief holes, said chamber control assembly has a second of the at least one shutter valve disposed in said shutter valve bore for releasing pressures in said active cavity at a preset limit, said second of the at least one shutter valve has a first of the at least two access ports connected to said sensing hole, a first of the at least two seal rings disposed between a front of said shutter bore and said seal section of said head, a second of the at least two access ports connected to said multiple relief holes through said back groove and a bottom of said back seat assembly, said chamber control assembly also has a pressure relief valve and multiple sensors.

7. The fluid process station of claim 6, wherein said second of the at least one shutter valve is a check valve, said check has said first of the at least two access ports used as a upstream port, said second of the at least two access ports used as a downstream port.

8. The fluid process station of claim 1, wherein the at least one fluid pad assembly has a fluid pad having a port A and a port B, a third of the at least one shutter valve having a first of the at least two access ports connected to said port A, a second of the at least two access ports connected to said port B, a third of the at least two ports extending to outsides of the at least one fluid pad assembly, said sensing section has said concave profile having a cylinder and a groove engaged with said sensing bore, a first of the at least two seal rings disposed in said groove and a second of the at least two seal rings disposed between a front of said shutter bore and said seal section, a third of the least two seal rings disposed between said end of said shutter and said adjustable back seat assembly.

9. The fluid process station of claim 8, wherein said third of the at least one shutter valve are constructed as a counter-balanced valve, said counter-balanced valve has two internal access ports and two external access ports.

10. The fluid process station of claim 8, wherein said third of the at least one shutter valve is a pressure regulator, said pressure regulator has said third of the at least two access ports used as a upstream port, said second of the at least two access ports used as a downstream port, said first of the at least two access ports connected to said downstream port used as a sensing port.

\* \* \* \* \*